(12) United States Patent
Comparan et al.

(10) Patent No.: US 8,217,953 B2
(45) Date of Patent: Jul. 10, 2012

(54) ANISOTROPIC TEXTURE FILTERING WITH TEXTURE DATA PREFETCHING

(75) Inventors: Miguel Comparan, Rochester, MN (US); Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 12/110,045

(22) Filed: Apr. 25, 2008

(65) Prior Publication Data
US 2009/0315908 A1      Dec. 24, 2009

(51) Int. Cl.
*G09G 5/00*      (2006.01)
(52) U.S. Cl. ...................................................... 345/582
(58) Field of Classification Search ........... 345/582–588
See application file for complete search history.

(56) References Cited

U.S. PATENT DOCUMENTS

| | | | | | |
|---|---|---|---|---|---|
| 5,694,568 | A | * | 12/1997 | Harrison et al. | 711/213 |
| 6,005,582 | A | * | 12/1999 | Gabriel et al. | 345/586 |
| 6,104,415 | A | * | 8/2000 | Gossett | 345/552 |
| 6,433,789 | B1 | * | 8/2002 | Rosman | 345/582 |
| 6,778,181 | B1 | * | 8/2004 | Kilgariff et al. | 345/582 |
| 7,027,062 | B2 | * | 4/2006 | Lindholm et al. | 345/552 |
| 7,245,302 | B1 | * | 7/2007 | Donham et al. | 345/519 |
| 7,525,551 | B1 | * | 4/2009 | Newhall et al. | 345/587 |

* cited by examiner

*Primary Examiner* — Xiao M. Wu
*Assistant Examiner* — Charles Tseng
(74) *Attorney, Agent, or Firm* — Wood, Herron & Evans LLP

(57) ABSTRACT

A circuit arrangement and method utilize texture data prefetching to prefetch texture data used by an anisotropic filtering algorithm. In particular, stride-based prefetching may be used to prefetch texture data for use in anisotropic filtering, where the value of the stride, or difference between successive accesses, is based upon a distance in a memory address space between sample points taken along the line of anisotropy used in an anisotropic filtering algorithm.

2 Claims, 8 Drawing Sheets

ANISOTROPIC TEXTURE FILTERING WITH TEXTURE DATA PREFETCHING

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

In addition, as processor architectures improve in terms of raw performance, other considerations, such as the communication costs of storing and retrieving data, become significant factors in overall performance. Data is typically organized within a memory address space that represents the addressable range of memory addresses that can be accessed by a processor. Both the instructions forming a computer program and the data operated upon by those instructions are often stored in a memory system and retrieved as necessary by a processor when executing the computer program. In order to balance cost, performance, and storage capacity, multi-level memory architectures have been developed.

Often, a computer relies on a relatively large, slow and inexpensive mass storage system such as a hard disk drive or other external storage device, an intermediate main memory that uses dynamic random access memory devices (DRAM's) or other volatile memory storage devices, and one or more high speed, limited capacity cache memories, or caches, implemented with static random access memory devices (SRAM's) or the like (e.g., L1, L2, L3, etc. caches). In some instances, instructions and data are stored in separate instruction and data cache memories to permit instructions and data to be accessed in parallel. One or more memory controllers are then used to swap the information from segments of memory addresses, often known as "cache lines", between the various memory levels to attempt to maximize the frequency that requested memory addresses are stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance hit.

In some designs, prefetching is used to reduce the impact of cache misses, and may be used both with instructions and the data processed by instructions. From the standpoint of instructions, prefetching typically refers to transferring instructions into a processor, or into a cache or other memory storage element disposed within or accessible by the processor, prior to an attempt to issue the instruction by the instruction issue logic for the processor. Likewise, for non-instruction data, prefetching typically refers to transferring data into a processor, or into a cache or other memory storage element disposed within or accessible by the processor, prior to a request for the data being generated via execution of an instruction within the processor.

For program instructions, for example, instruction prefetching is often used to attempt to initiate the retrieval of instructions into an instruction cache or buffer before the instructions are needed by a processor. Branch prediction may also be used, for example, to predict whether certain conditional branches will be taken, with prefetching used to initiate the retrieval of the instructions that are expected to follow the conditional branches if those branches are or are not taken.

Prefetching may also be used for other types of data, and often takes advantage of the fact that data requests are often somewhat regular in nature for a particular set of program instructions. Stride-based prefetching, for example, takes advantage of the fact that data is often retrieved in a pattern having a relatively constant offset, referred to as a "stride", between successive accesses. Stride-based prefetching typically determines a difference between the memory addresses of consecutive accesses, and then prefetches additional data located one or more multiples of that difference from the prior accesses.

Caching and prefetching often provide substantial performance gains in data-intensive algorithms that rely heavily on retrieved data. One area that is particularly data-intensive is rasterization, and in particular texture processing performed in a rasterization process utilized in various image processing applications. Rasterization is a process in 3D graphics where three dimensional geometry that has been projected onto a screen is "filled in" with pixels of the appropriate color and intensity. A texture mapping algorithm is typically incorporated into a rasterization process to paint a texture onto geometric objects placed into a scene.

In order to paint a texture onto a placed object in a scene, the pixels in each primitive making up the object are typically transformed from 3D scene or world coordinates (e.g., x, y and z) to 2D coordinates relative to a procedural or bitmapped texture (e.g., u and v). The fundamental elements in a texture are referred to as texels (or texture pixels), and being the fundamental element of a texture, each texel is associated with a single color. Due to differences in orientation and distance of the surfaces of placed geometric primitives relative to the viewer, a pixel in an image buffer will rarely correspond to a single texel in a texture. As a result, texture filtering is typically performed to determine a color to be assigned to a pixel based upon the colors of multiple texels in proximity to the texture mapped position of the pixel.

A number of texture filtering algorithms may be used to determine a color for a pixel, including simple interpolation, bilinear filtering, trilinear filtering, and anisotropic filtering, among others. With many texture filtering algorithms, weights are calculated for a number of adjacent texels to a pixel, the weights are used to scale the colors of the adjacent texels, and a color for the pixel is assigned by summing the scaled colors of the adjacent texels. The color is then either stored at the pixel location in a frame buffer, or used to update a color that is already stored at the pixel location.

Bilinear filtering, for example, uses the coordinates of a texture sample to perform a weighted average of four adjacent pixels, weighted according to how close the sample coordinates are to the center of the pixel. Bilinear filtering often can reduce the blockiness of closer details, but often does little to reduce the noise that is often found in distant details.

Trilinear filtering involves using MIP mapping, which uses a set of prefiltered texture images that are scaled to successively lower resolutions. The algorithm uses texture samples from the high resolution textures for portions of the geometry near to the camera, and low resolution textures for the portions distant to the camera. MIP mapping often reduces nearby pixelation and distant noise; however, detail in the distance is often lost and needlessly blurred. The blurriness is due to the texture samples being taken from a MIP level of the texture that has been pre-scaled to a low resolution in both the x and y dimensions uniformly, such that resolution is lost in the direction perpendicular to the direction that the texture is most compressed.

Anisotropic filtering involves taking multiple samples along a "line of anisotropy" which runs in the direction that the texture is most compressed. Each of these samples may be bilinear or trilinear filtered, and the results are then averaged together. This algorithm allows the compression to occur in only one direction. By doing so, less blurring often occurs in more distant features.

However, it has been found that the performance of anisotropic filtering is greatly dependent upon the number of samples taken along the line of anisotropy. Larger numbers of samples greatly improve image quality, but also greatly increase the processing overhead of the algorithm. In addition, high quality anisotropic filtering often introduces substantial memory bandwidth limitations due to the need to retrieve the texture data necessary to perform the required calculations.

For example, assuming textures are stored in memory uncompressed and each pixel uses 16 bytes of RGB color and alpha channel information, at a setting of 16 texel samples per line of anisotropy, the memory traffic for each pixel of a rasterized polygon using anisotropic filtering would involve loading 256 bytes. Assuming, for example, a resolution of 1024×768 pixels and animation running at 30 frames per second, the bandwidth needed for a full screen of anisotropic filtered textures would be approximately 5.7 Gigabytes per second.

Given the high bandwidth required, it is crucial for performance reasons to ensure that as much as possible of the required texture data is cached in a processor, as otherwise the time required to retrieve the texture data into the cache would introduce substantial delays in an anisotropic filtering algorithm. However, particularly with larger textures and/or with long lines of anisotropy, even when texture compression is used, the texture data will often span numerous cache lines, so the required texture data is often not cached when it is needed by an anisotropic filtering algorithm, leading to unacceptable performance degradation.

Therefore, a need exists in the art for a manner of improving the performance of anisotropic filtering algorithms, particularly from the standpoint of minimizing the performance penalties associated with having to retrieve texture data in association with such algorithms.

SUMMARY OF THE INVENTION

The invention addresses these and other problems associated with the prior art by incorporating texture data prefetching to prefetch texture data used by an anisotropic filtering algorithm. In embodiments consistent with the invention, in particular, stride-based prefetching is used, where the value of the stride, or difference between successive accesses, is based upon a distance in a memory address space between sample points taken along the line of anisotropy used in an anisotropic filtering algorithm.

Consistent with one aspect of the invention, a circuit arrangement including a memory storage element and processing logic coupled to the memory storage element and configured to perform anisotropic filtering using a texture including texture data stored in a memory address space. The processing logic is configured to perform anisotropic filtering based upon a plurality of sample points defined along a line of anisotropy for the texture, and the processing logic is further configured to initiate a prefetch of texture data for a sample point among the plurality of sample points into the memory storage element using a stride value representative of a distance in the memory address space between sample points in the texture.

Consistent with another aspect of the invention, a method performs anisotropic texture filtering using a texture including texture data stored in a memory address space. The method includes determining a plurality of sample points along a line of anisotropy for the texture, determining a stride value representative of a distance in the memory address space between sample points in the texture, initiating a prefetch of texture data for a sample point among the plurality of sample points using the stride value, and performing anisotropic filtering using the prefetched texture data.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention implement texture data prefetching into an anisotropic filtering algorithm to reduce the memory performance bottlenecks associated with retrieving texture data using in an anisotropic filtering algorithm. In embodiments consistent with the invention, in particular, a form of stride-based prefetching is used, where the value of the stride, or difference between successive accesses, is based upon a distance in a memory address space between sample points taken along the line of anisotropy used in an anisotropic filtering algorithm.

In particular, it has been found that since the sample points along a line of anisotropy are evenly spaced along the line, and texture images are often stored in memory as evenly spaced sequential data, the length between each of the sample points in a memory address space often corresponds to a fixed data size interval. Since this interval often can be calculated at the beginning of an anisotropic filtering algorithm for each screen pixel, a caching architecture can be controlled so as to concurrently work to ensure that the right texels are cached (i.e., prefetching the texture data if it isn't already in the cache) while the texels that have already been loaded into registers can be used in the weighted averaging portion of the algorithm. This allows the floating point math of the algorithm and the texel fetching from memory to occur concurrently, and thus decrease memory overhead and increase performance.

Hardware and Software Environment

Figure 1:
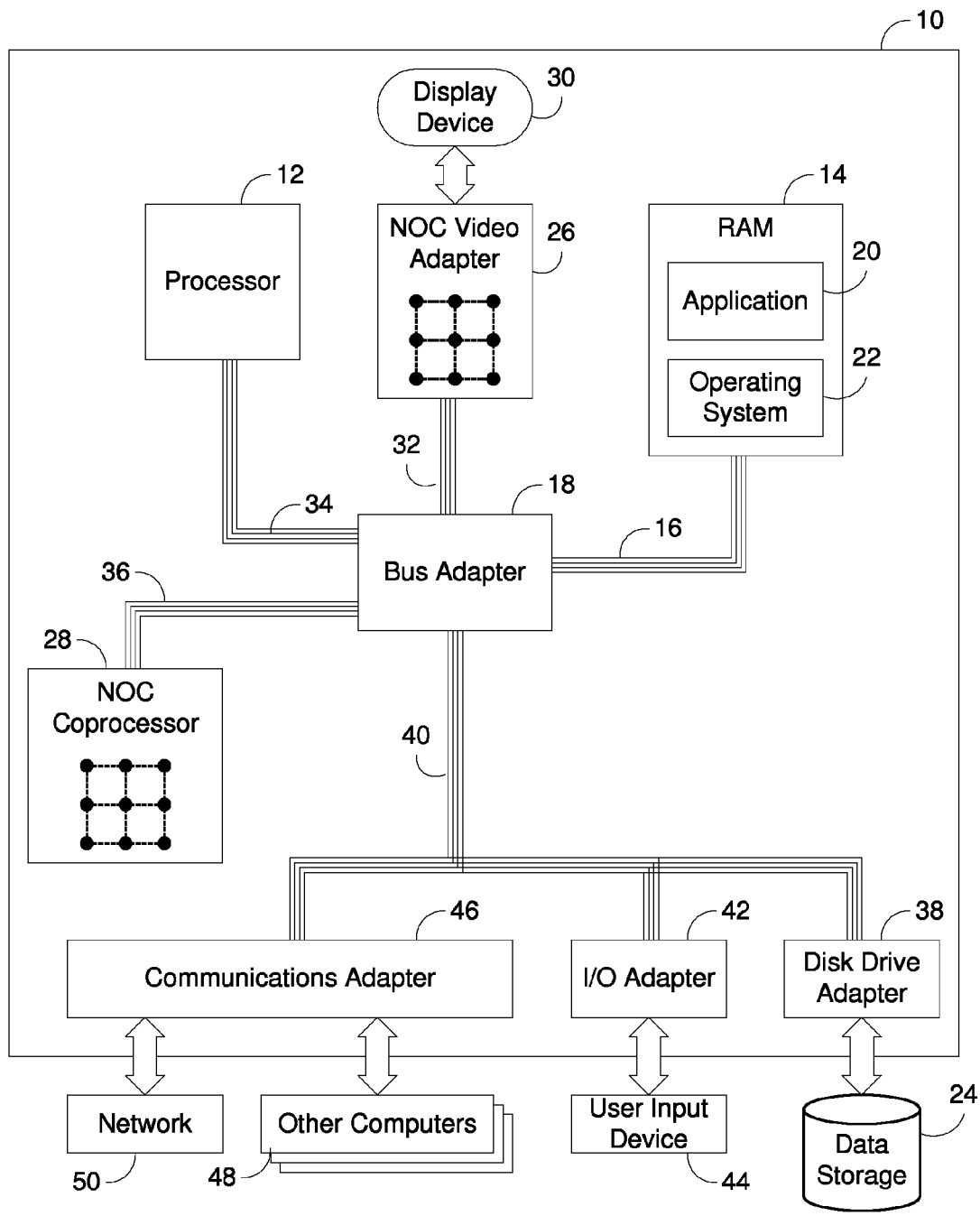
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
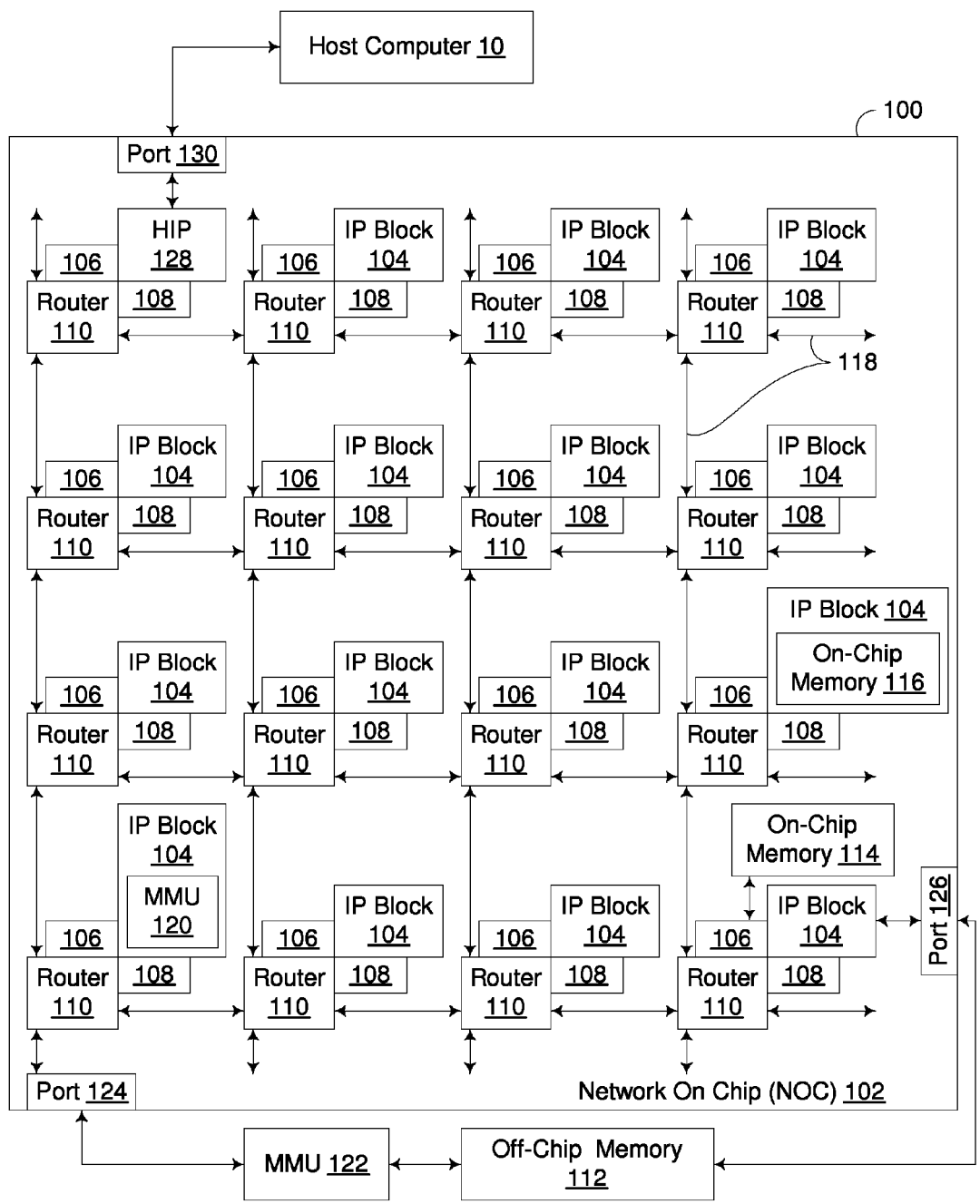
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
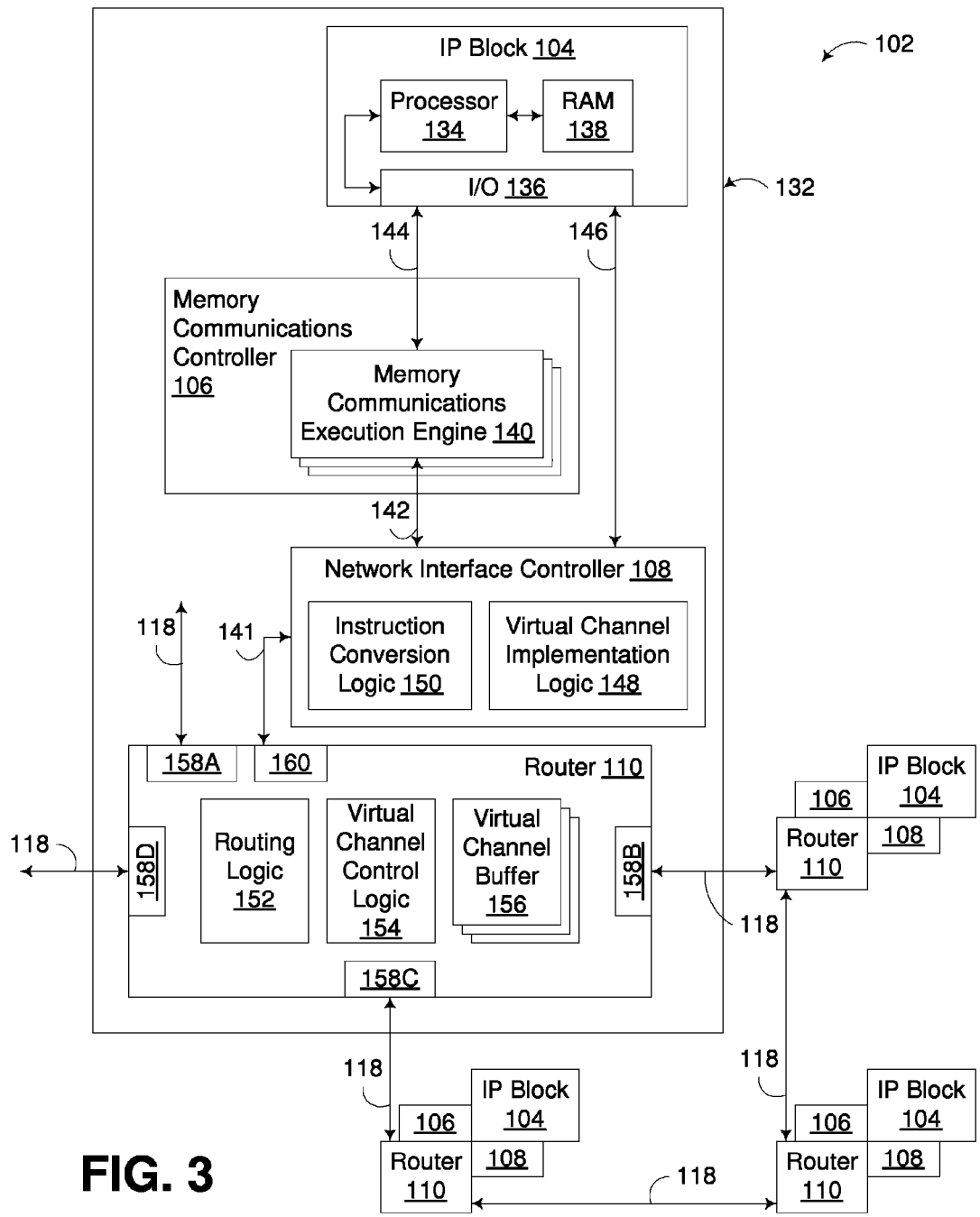
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
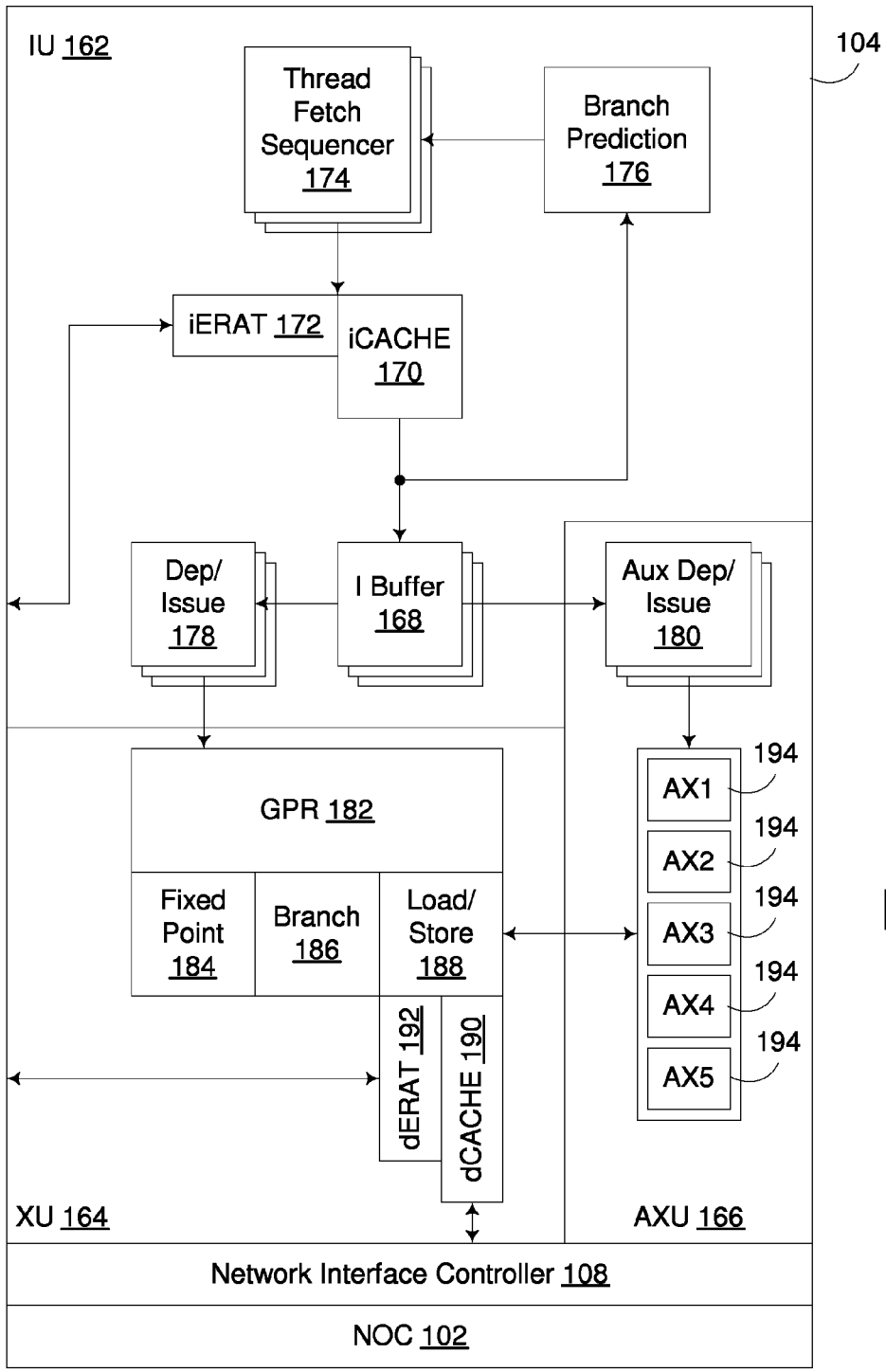
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Anisotropic Filtering With Texture Data Prefetching

Figure 5:
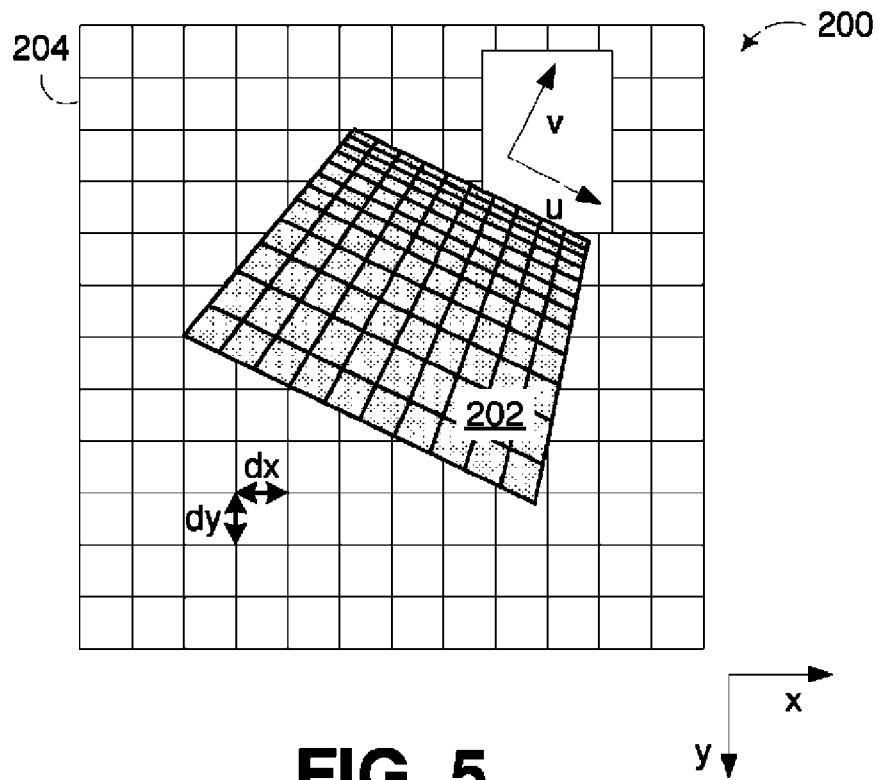
FIG. 5 is a block diagram of an exemplary texture oriented in a 3D image space, for which anisotropic filtering with texture data prefetching consistent with the invention may be performed.

To implement anisotropic filtering with texture data prefetching in a manner consistent with the invention, texture data is selectively prefetched based upon a stride value that is based on the line of anisotropy for a texture placed in a scene. FIG. 5, for example, illustrates an exemplary scene 200 within which is displayed a texture 202 oriented in a 3D environment. The scene is described using (x,y) pixel coordinates defined along x and y axes of an (x,y) coordinate system 204, with each pixel (x,y) representing the smallest addressable element of a displayed image.

Figure 6:
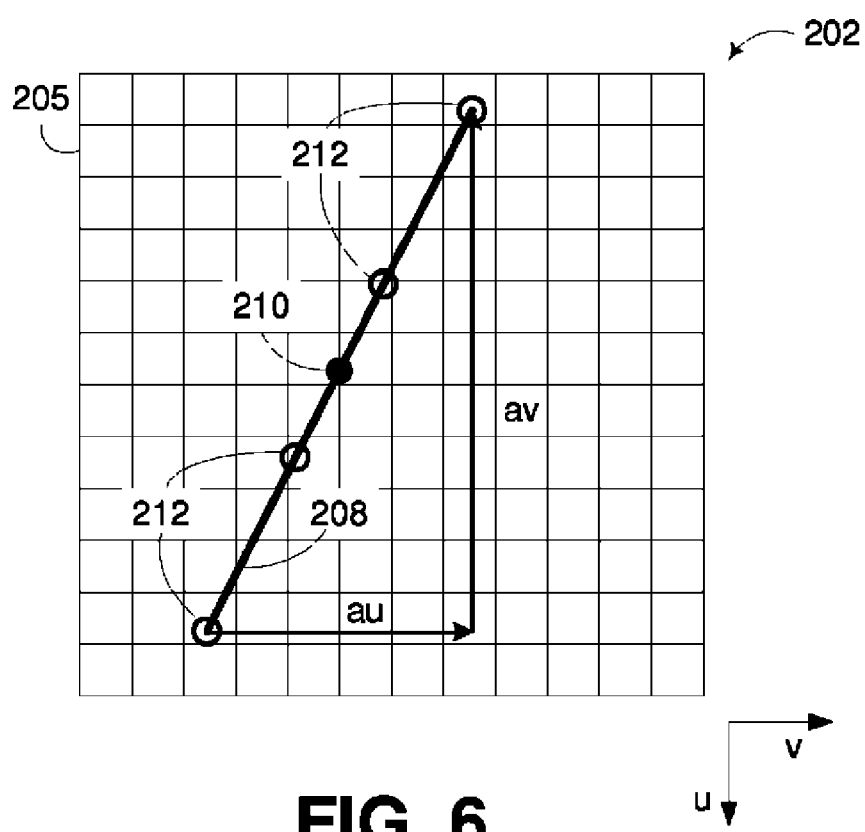
FIG. 6 is a block diagram of a line of anisotropy for the texture of FIG. 5.

As shown in FIG. 6, texture 202 is described using (u,v) texel coordinates defined along u and v axes of a (u,v) coordinate system 206. When placed in scene 200, e.g., on the surface of a graphical primitive, each texel of texture 202 may be mapped to a particular pixel in scene 200 by transposing the (u,v) coordinate system of the texture onto the (x,y) coordinate system of the scene. The lines "u-v" and "x-y" in FIG. 5 respectively show the relative orientation of the (u,v) coordinate system relative to that of the (x,y) coordinate system.

It will be appreciated that when performing rasterization on a primitive, anisotropic filtering may be performed for each pixel in the scene or image that corresponds to the primitive. Each such pixel may be mapped to a particular texture sample point in the texture such that, for each pixel to be processed during rasterization, a corresponding texture sample point may be calculated in (u,v) coordinates by transposition of the (x,y) coordinate of the pixel to the (u,v) coordinate system. It will be appreciated that it is rare for an (x,y) coordinate for a screen pixel to map to integer values in the (u,v) coordinate system due to the variable scale, rotation and perspective of the surface of the primitive upon which the texture to be drawn, so the corresponding (u,v) coordinates for a screen pixel are typically defined as floating point values. In the illustrated embodiment, an anisotropic filtering algorithm is performed separately for each pixel corresponding to the primitive, so the anisotropic filtering algorithm typically receives as its input either the (x,y) coordinates of the pixel to be drawn (which are subsequently converted to (u,v) coordinates by the algorithm), or the (u,v) coordinates of the texture sample point corresponding to that pixel.

Figure 7:
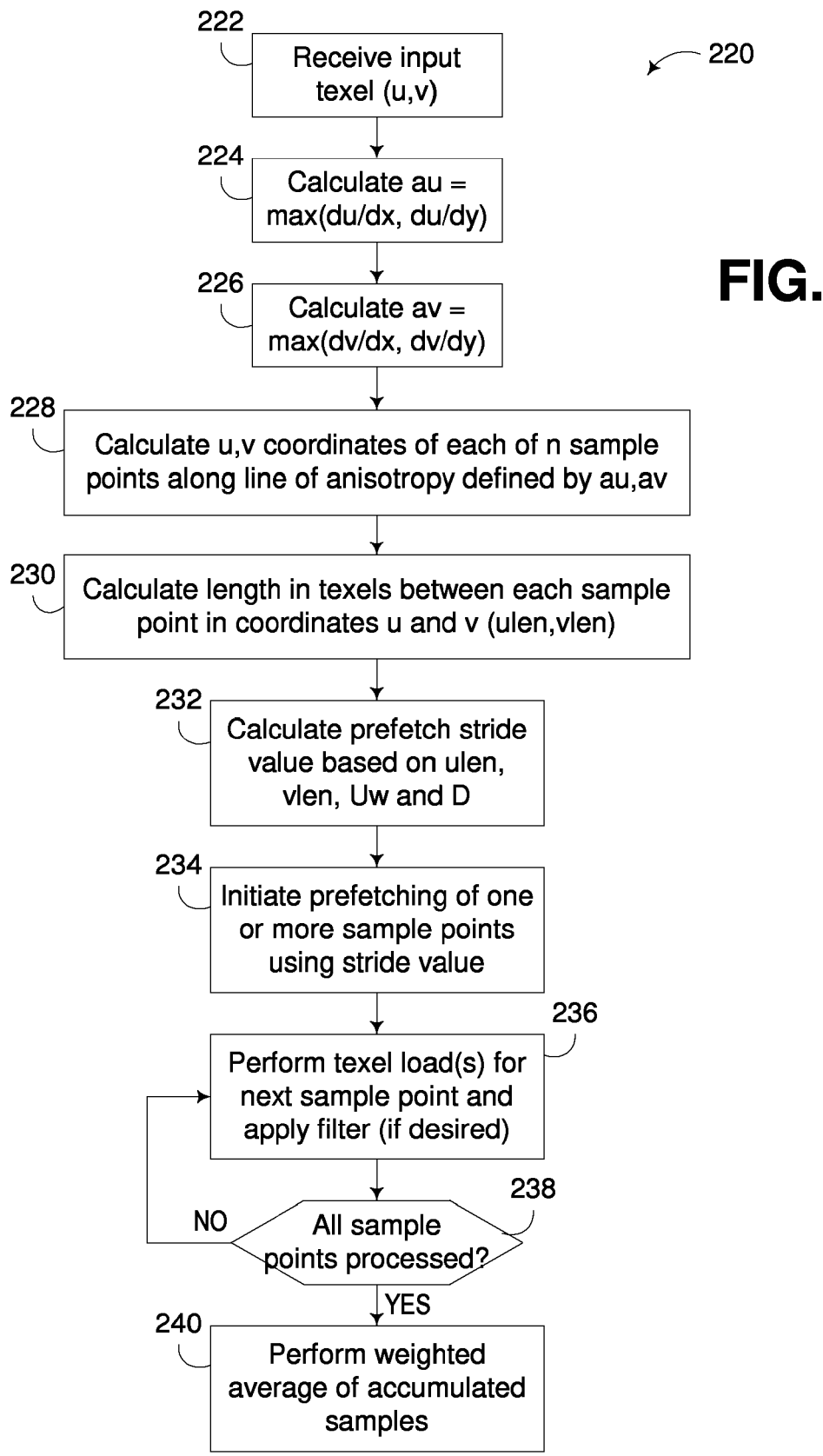
FIG. 7 is a flowchart illustrating an exemplary implementation of a routine for implementing anisotropic filtering with texture data prefetching consistent with the invention.

FIG. 7, for example, illustrates one exemplary implementation of an anisotropic filtering routine 220 consistent with the invention, which receives at block 222 an input texture sample point defined in (u,v) coordinates.

Next, a line of anisotropy for the input texture sample point is defined along a direction of maximum compression for the texture, which is described with respect to the (u,v) coordinate system as follows:

$$au = \max(du/dx, du/dy)$$

$$av = \max(dv/dx, dv/dy)$$

where du/dx is the ratio between u texel coordinate units along the u axis versus the screen (pixel) x coordinate along the x axis, and du/dy is the ratio between u texel coordinate units along the u axis versus the screen (pixel) y coordinate along the y axis. Similarly, dv/dx is the ratio between v texel coordinate units along the v axis versus the screen (pixel) x coordinate along the x axis, and dv/dy is the ratio between v texel coordinate units along the v axis versus the screen (pixel) y coordinate along the y axis. The calculation of these values is performed in blocks 224 and 226 of FIG. 7.

An exemplary line of anisotropy 208 is illustrated in FIG. 6, centered on an input texture sample point 210 with (u,v) coordinates, and having lengths au, av along the u, v axes, respectively.

Returning to FIG. 7, after au and av are calculated for the line of anisotropy, (u,v) coordinates for n sample points (which may also be referred to as sub-sample points) are calculated in block 228. The n sample points are evenly spaced along the line of anisotropy, and the (u,v) coordinates of each such sample point i (where i=0 to n−1) may be calculated as follows:

$$ui = u + (i*au/(n-1) - au/2)$$

$$vi = v + (i*av/(n-1) - av/2)$$

To implement texture prefetching in association with anisotropic filtering in a manner consistent with the invention, texture data for selected sample points among the n sample points is prefetched such that retrieval of the texture data is accelerated to make the data available for use by the anisotropic filtering routine when needed. The texture data may include, for example, color data from one or more texels in a texture map (including texture data from one or more texture maps, e.g., as used in MIP-based filtering).

The prefetch of such texture data is based upon the locations of the sample points within the texture, and in particular, the locations of the sample points along the line of anisotropy calculated in the manner described above. It has been found, in particular, that since the sample points along the line of anisotropy are evenly spaced along the line, and since texture images are typically stored in memory as evenly spaced sequential data, the length between each of the sample points in a memory address space often corresponds to a fixed data size interval. In addition, since this interval often can be calculated at the beginning of an anisotropic filtering algorithm for each screen pixel, a caching architecture can be controlled so as to concurrently work to ensure that the right texels are cached (i.e., prefetching the texture data if it isn't already in the cache) while the texels that have already been loaded into registers can be used in the weighted averaging portion of the algorithm. This allows the floating point math of the algorithm and the texel fetching from memory to occur concurrently, and thus decrease memory overhead and increase performance.

The prefetch of texture data generally results in the texture data being retrieved into a higher level of a multi-level memory architecture so that when an attempt is made to use the texture data, e.g., by loading the texture data into a working register in a processor, the texture data is resident in a higher level of memory than it would otherwise have been, thus reducing the latency associated with loading the texture data into a working register. The prefetch therefore can generally be considered to result in the texture data being retrieved into a memory storage element such as a cache (e.g., an L1 cache), or even a dedicated buffer or one or more registers in a register file.

The aforementioned interval between sample points, which is referred to herein as a prefetch stride value, is calculated based upon the locations of sample points along the line of anisotropy. To do so, length values representative of the distance in texels between adjacent sample points along the u and v axes (designated herein as ulen and vlen) may be calculated in block 230 of FIG. 7 as follows:

$$ulen = au/(n-1)$$

$$vlen = av/(n-1)$$

In other embodiments, the interval between sample points need not be calculated between adjacent sample points. For example, the interval may be based on the distance between two sample points that are separated from one another by one or more other sample points.

The prefetch stride value, which represents the distance in the memory address space between the adjacent sample points, is then calculated in block 232 of FIG. 7 as follows:

$$stride = vlen*(Uw*D) + ulen*D$$

where Uw is the width of the texture map in pixels in the U direction and D is the data size in bytes (or other addressable unit) of each pixel in the texture map. It will be appreciated that the data size may be represented in units other than bytes. In addition, the aforementioned equation assumes that the texture map is stored in memory contiguously and in a regular and uncompressed manner. In other embodiments, the texture map may be stored in a compressed format, whereby the conversion between the distance in texels and the distance in the memory address space may be calculated as appropriate for the particular manner in which the texture map is stored, which manner will be apparent to one of ordinary skill in the art having the benefit of the instant disclosure.

Once the prefetch stride value is calculated, the value is used to initiate prefetching of texture data for one or more sample points, as shown in block 234 of FIG. 7. By initiating the prefetching of the texture data for the sample points, the texture data is moved to a relatively higher level in the memory hierarchy so that when the texture data is needed by the anisotropic filtering routine, the latency of retrieving that data is minimized. Desirably, the prefetch of texture data for a sample point is initiated before an attempt is made to load the texture data into a working register during execution of the anisotropic filtering routine. Furthermore, in embodiments where each sample point is separately processed (e.g., by separately applying bilinear or trilinear filtering to each sample point to generate a sample value for that sample point) prior to performing a weighted average of the sample points, in many instances, it is desirable to initiate the prefetch of texture data for a sample point before completing the calculations involving an earlier sample point to minimize the latency associated with processing the latter sample point.

Consequently, as shown in FIG. 7, once prefetching of the texture data for one or more sample points has been initiated, routine 220 then initiates a loop at block 236 to perform one or more texel loads for each sample point, until such time as all sample points have been processed. In addition, if it is desired to apply any filtering to each sample point, then block 236 may also apply such filtering (e.g., bilinear or trilinear filtering) for the sample point using the loaded texture data. At that point, block 238 passes control to block 240 to perform a weighted average of the accumulated samples and generate an output texel value (typically a texel color) for the texel.

Prefetching texture data based upon a stride value may be implemented in a number of manners consistent with the invention, including any number of conventional manners of prefetching data in general in a processor, whether implemented in hardware, in software, or in a combination thereof.

For example, initiating a prefetch of texture data may be implemented primarily in software, i.e., within the anisotropic filtering routine, such that the anisotropic filtering program code calculates the stride value and initiates the prefetch. In one embodiment, for example, the anisotropic filtering program code may issue cache hints to initiate retrieval of texture data for selected sample points. The cache hints may be implemented using dedicated instructions, or in the alternative, may be implemented using conventional load or touch instructions.

In another embodiment, initiating a prefetch of texture data may be implemented at least partially in hardware, and may incorporate prefetch logic within a processor to handle the prefetch of texture data. The prefetch logic may be implemented, for example, using a stride-based prefetcher, or using a sequencer that processes a dedicated instruction supplied by the anisotropic filtering program code that specifies one or more texture parameters to control how prefetching is to be performed at the hardware level. In still another embodiment, prefetching may be performed completely in hardware, and without any dedicated functionality in software to manage or initiate the prefetching, e.g., by tracking or monitoring memory access requests to determine the appropriate stride.

Figure 8:
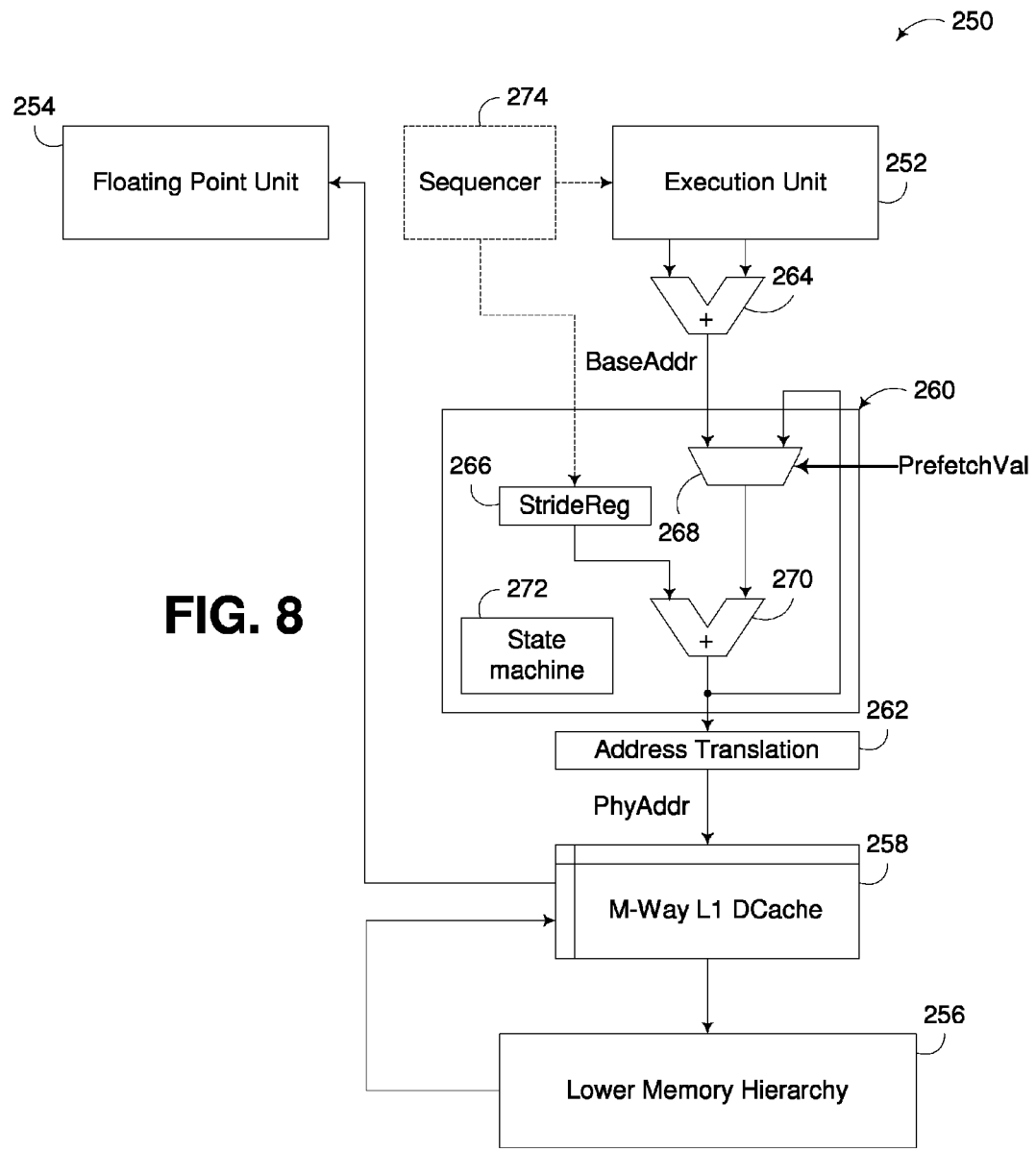
FIG. 8 is a block diagram of one exemplary implementation of a processing unit suitable for implementing anisotropic filtering with texture data prefetching consistent with the invention.

One exemplary hardware-based implementation is illustrated in greater detail in FIG. 8. In this figure, a processing unit 250 incorporating an execution unit 252 (e.g., a fixed point execution unit) and a separate floating point unit 254 coupled to a memory hierarchy 256 through an M-way L1 data cache 258, which in this implementation, functions as a memory storage element into which texture data may be prefetched. The memory hierarchy 256 may include, for example, an L2, L3 or other lower level cache, as well as volatile or non-volatile main storage, whether local or remote relative to the processing unit. Processing unit 250 may be implemented, for example, in an IP block such as an IP block 104 from FIGS. 1-4. In the alternative, processing unit 250 may be implemented in other processor architectures that issue and execute instructions, including single or multi-core microprocessors or microcontrollers. In addition, other components in processing unit 250, e.g., register files, instruction units, etc. are not shown in FIG. 8 in order to simplify a discussion of the invention.

Hardware-based prefetch logic 260 is used in processing unit 250 to perform stride-based prefetching in a manner consistent with the invention. The prefetch logic is disposed above or before cache 258, as well as before address translation logic 262 that converts effective or virtual addresses (e.g., a base addresses generated by execution unit 252 using an adder 264) into physical addresses, and thus operates on effective or virtual addresses.

Prefetch logic 260 includes a stride register 266, within which is stored a stride value calculated in the manner described above. A multiplexer 268 receives at one input the base address generated by execution unit 252 and adder 264, and at another input the output of an adder 270 that is fed back to multiplexer 268. A state machine 272 controls the operation of the prefetch logic. During normal memory accesses generated by execution unit 252, multiplexer 268 passes the output of adder 264 to one input of adder 270, while stride register 266 is cleared such that the base address from adder 264 is passed unchanged to address translation logic 262.

When prefetching is initiated, a stride value is stored in stride register 266, and state machine 272 asserts a prefetch value signal at the select input of multiplexer 268 to feed back the prior base address (which corresponds to the location in the memory address space of the texture data for the first sample point) to adder 270, such that the prior base address is summed with the stride value and passed to address translation logic 262 to initiate a fetch of the texture data for the next sample point into the L1 cache 258. On subsequent memory access cycles, texture data for additional sample points may be prefetched by continuing to sum the stride value with the last address output from adder 270. The number of cycles for which the prefetch logic will issue new memory requests may be fixed (e.g., equal to the number of sample points in used for anisotropic filtering), or may be programmable.

In one embodiment, stride register 266 may be a special purpose register that is accessible by program code. In another embodiment, a dedicated instruction may be defined in an instruction set to control prefetching. A dedicated instruction may specify, for example, one or more texture parameters, including but not limited to one or more of the u, v floating point values for the initial texture sample point, the starting address of the texture, the width in texels or bytes of each line of the texture, the number of sample points to be used, the line of anisotropy lengths (au, av), the pixel/texel coordinate ratios (du/dx, du/dy, dv/dx, dv/dy) or any other parameters that may be used in performing anisotropic filtering. By providing such texture parameters in an instruction, the prefetch logic may perform some or all of the operations associated with anisotropic filtering, as well as the stride-based prefetching. For example, as illustrated in FIG. 8, a separate sequencer 274 may optionally be incorporated to process a dedicated instruction and control the prefetch logic as appropriate for the texture parameters provided in the instruction.

Figure 9:
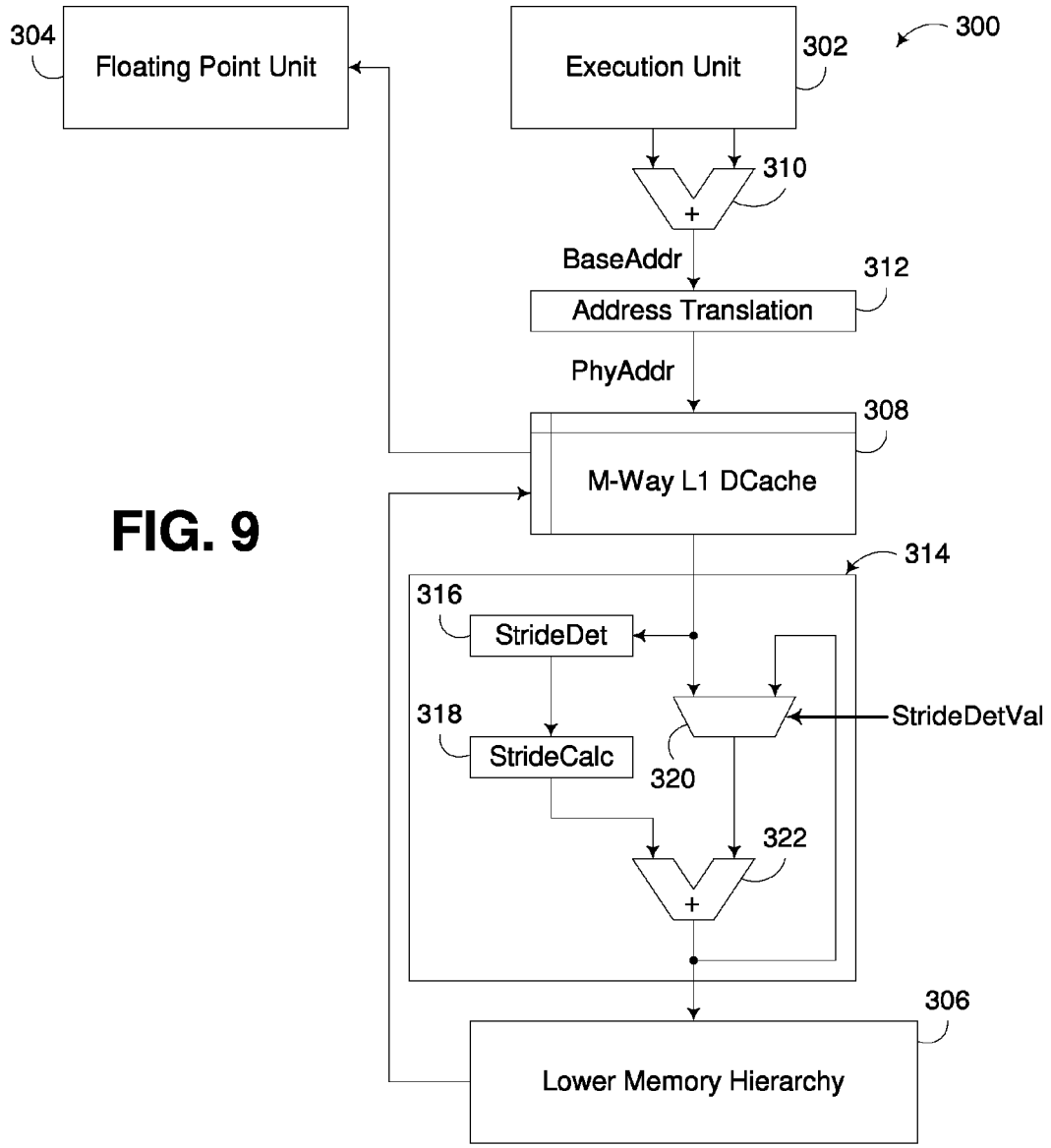
FIG. 9 is a block diagram of another exemplary implementation of a processing unit suitable for implementing anisotropic filtering with texture data prefetching consistent with the invention.

FIG. 9 illustrates another suitable hardware-based implementation of a processing unit 300, in which an execution unit 302 and floating point unit 304 are coupled to a lower memory hierarchy 306 via an M-way L1 data cache 308 functioning as the memory storage element into which texture data may be prefetched. For normal memory accesses, an adder 310 generates a base address for execution unit 302, which is then translated from effective or real format to a physical address via address translation logic 312. Rather than being disposed above the L1 cache; however, prefetch logic 314 in processing unit 300 is disposed below or after L1 cache 308. Stride detection logic 316 monitors or tracks memory accesses made by L1 cache 308 (representing the cache misses for the memory accesses made by execution unit 302) and attempts to detect a stride value from such accesses. Stride calculation logic 318 then calculates a suitable stride for use in stride-based prefetching. The addresses output by L1 cache 308 to the lower level memory hierarchy 306 are fed in this implementation to one input of a multiplexer 320, the other input of which is fed back the output of an adder 322. Multiplexer 320 outputs to one input of adder 322, with the other input receiving a data signal from stride calculation logic 318.

For normal memory accesses, the memory addresses output by L1 cache 308 are passed unchanged through multiplexer 320 and adder 322, as stride calculation logic 318 does not output a stride value, and does not assert a stride detect value signal at the select input of multiplexer 320. When a stride is detected during anisotropic filtering, however, the calculated stride value is output to adder 322 and the select signal of multiplexer 320 is asserted such that the prior memory address output by L1 cache 308 is summed with the stride value and used to request another memory address separated by the stride value. Subsequent memory access cycles may then request additional memory addresses corresponding to additional sample points for a fixed or programmable number of sample points. In this manner, stride-based prefetching may be performed by the hardware without specific functionality being implemented within the anisotropic filtering program code executed by the processing unit.

Various modifications may be made without departing from the spirit and scope of the invention. For example, rather than prefetching into a cache, prefetching may be performed into a dedicated buffer, or into a register or group of registers in a register file. Other modifications will be apparent to one of ordinary skill in the art. Therefore, the invention lies in the claims hereinafter appended.

What is claimed is:

1. A method of performing anisotropic texture filtering using a texture defined in a texel coordinate system having u and v axes and a scene defined in a pixel coordinate system having x and y axes, the method comprising, for an initial sample point in the texture at u,v coordinates:

determining a line of anisotropy, including determining au, av values for the line of anisotropy as follows:

$$au = \max(du/dx, du/dy)$$

$$av = \max(dv/dx, dv/dy)$$

where du/dx is a ratio between texel coordinates along the u axis and pixel coordinates along the x axis, du/dy is a ratio between texel coordinates along the u axis and pixel coordinates along the y axis, dv/dx is a ratio between texel coordinates along the v axis and pixel coordinates along the x axis, and dv/dy is a ratio between texel coordinates along the v axis and pixel coordinates along the y axis;

determining n sample points along the line of anisotropy, including determining ui, vi coordinates for each sample point i, where i=0 to n−1, as follows:

$$ui = u + (i*au/(n-1) - au/2)$$

$$vi = v + (i*av/(n-1) - av/2)$$

determining a length ulen between adjacent sample points along the u axis and a length vlen between adjacent sample points along the v axis as follows:

$$u\text{len} = au/(n-1)$$

$$v\text{len} = av/(n-1)$$

determining a stride value as follows:

$$\text{stride} = v\text{len}*(Uw*D) + u\text{len}*D$$

where Uw is a width of the texture in texels along the u axis and D is a data size for each texel in memory;

for each of the n sample points, loading texture data for such sample point and applying a filter to the first sample point using the loaded texture data for such sample point to generate a sample result;

for each of the n sample points after a first sample point, using the stride value to initiate a prefetch of the texture data for such sample point prior to attempting to load the texture data for such sample point; and averaging the sample results for the n sample points.

2. A circuit arrangement, comprising:

a memory storage element; and processing logic coupled to the memory storage element and configured to perform anisotropic texture filtering using a texture defined in a texel coordinate system having u and v axes and a scene defined in a pixel coordinate system having x and y axes, the processing logic configured to, for an initial sample point in the texture at u,v coordinates:

determine a line of anisotropy, including determine au, av values for the line of anisotropy as follows:

$$au = \max(du/dx, du/dy)$$

$$av = \max(dv/dx, dv/dy)$$

where du/dx is a ratio between texel coordinates along the u axis and pixel coordinates along the x axis, du/dy is a ratio between texel coordinates along the u axis and pixel coordinates along the y axis, dv/dx is a ratio between texel coordinates along the v axis and pixel coordinates along the x axis, and dv/dy is a ratio between texel coordinates along the v axis and pixel coordinates along the y axis;

determine n sample points along the line of anisotropy, including determine ui, vi coordinates for each sample point i, where i=0 to n−1, as follows:

$ui = u + (i*au/(n-1) - au/2)$ $vi = v + (i*av/(n-1) - av/2)$ determine a length ulen between adjacent sample points along the u axis and a length vlen between adjacent sample points along the v axis as follows:

$ulen = au/(n-1)$ $vlen = av/(n-1)$ determine a stride value as follows:

$stride = vlen*(Uw*D) + ulen*D$ where Uw is a width of the texture in texels along the u axis and D is a data size for each texel in memory;
for each of the n sample points, load texture data for such sample point and apply a filter to the first sample point using the loaded texture data for such sample point to generate a sample result;
for each of the n sample points after a first sample point, use the stride value to initiate a prefetch of the texture data for such sample point prior to attempting to load the texture data for such sample point; and
average the sample results for the n sample points.

* * * * *